(12) United States Patent
Sanderson et al.

(10) Patent No.: US 7,340,688 B2
(45) Date of Patent: Mar. 4, 2008

(54) APPLICATION OF PAGING TO A DATASET, GRAPHICAL DISPLAY WINDOW AND GRAPHICAL SCROLLBAR GRIP

(75) Inventors: Jacob A. Sanderson, Santa Rosa, CA (US); Takashi Tsuboi, San Francisco, CA (US); Min Sun, Novato, CA (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 581 days.

(21) Appl. No.: 10/972,820

(22) Filed: Oct. 25, 2004

(65) Prior Publication Data

US 2006/0107230 A1    May 18, 2006

(51) Int. Cl.
*G06F 3/048* (2006.01)
(52) U.S. Cl. .................. 715/786; 715/525; 715/815; 715/830; 345/684; 345/688
(58) Field of Classification Search ................ 715/786, 715/776, 525, 815, 830; 345/684, 688
See application file for complete search history.

(56) References Cited

U.S. PATENT DOCUMENTS 5,510,808 A * 4/1996 Cina et al. .................. 345/684
5,903,267 A * 5/1999 Fisher ........................ 715/786
6,006,227 A * 12/1999 Freeman et al. ................ 707/7
6,072,487 A * 6/2000 Kakuta et al. .............. 345/684

* cited by examiner

*Primary Examiner*—Stephen Hong
*Assistant Examiner*—Phenuel S Salomon

(57) ABSTRACT

A dataset is divided into overlapping logical pages, each associated with a different page index. A graphical display window is then filled with data corresponding to a current page offset which is mapped into a subset of data in a logical page corresponding to a current page index. Events associated with user operation of navigation controls are intercepted, and upon determining that an event causes updating of the current page offset to a defined position within the currently indexed page, the current page index and offset are transparently mapped to a new page index and offset. The window may be associated with a scrollbar grip, and upon intercepting an event associated with operation of the grip, the position of the grip is scaled by multiplying it by a scaling factor. The current page index is then set to the index of a logical page that scales to the grip's position.

13 Claims, 4 Drawing Sheets

APPLICATION OF PAGING TO A DATASET, GRAPHICAL DISPLAY WINDOW AND GRAPHICAL SCROLLBAR GRIP

BACKGROUND

Typically, the grip of a graphical scrollbar associated with a graphical display window will only update proportionally if the number of addressable rows (or cycles or other addressable elements) in a dataset is less than or equal to the number of positions that are available to the grip. For example, the Java JScrollBar model provides a 32-bit value for identifying the position of a scrollbar grip. Thus, if a dataset comprises $2^{32}$ rows of data, the scrollbar grip will update proportionally to the location of viewed data in a dataset. However, if a dataset comprises $2^{48}$ rows of data, the scrollbar grip will reach its lowest position far in advance of a user scrolling to the end of the dataset, and the user will not be able to rely on the position of the grip as an indicator of where they are in the dataset.

SUMMARY OF THE INVENTION

In one embodiment, a method comprises dividing a dataset into a plurality of overlapping logical pages and associating each of the logical pages with a different page index. A graphical display window is then filled with data corresponding to a "current page offset", with the current page offset being mapped into a subset of data in a logical page that corresponds to a "current page index". As a user operates one or more navigation controls associated with the graphical display window, these events are intercepted. Upon determining that an intercepted event causes updating of the current page offset to a defined position within the currently indexed page, the current page index and current page offset are transparently mapped to a new page index and a new page offset.

In another embodiment, a method comprises dividing a dataset into a plurality of overlapping logical pages and associating each of the logical pages with a different page index. A graphical display window associated with a graphical scrollbar grip is then filled with data corresponding to a "current page offset", with the current page offset being mapped into a subset of a logical page corresponding to a "current page index". As a user operates the scrollbar grip, these events are intercepted. Upon intercepting such an event, the position of the scrollbar grip is scaled by multiplying its position by a scaling factor. The scaling factor is equal to the number of rows in the dataset divided by the number of logical pages derived from the dataset. The current page index is then set to the page index of a logical page that scales to the scrollbar grip's position.

Other embodiments are also disclosed.

BRIEF DESCRIPTION OF THE DRAWINGS

Illustrative and presently preferred embodiments of the invention are illustrated in the drawings, in which.

DETAILED DESCRIPTION OF AN EMBODIMENT

Figure 1:
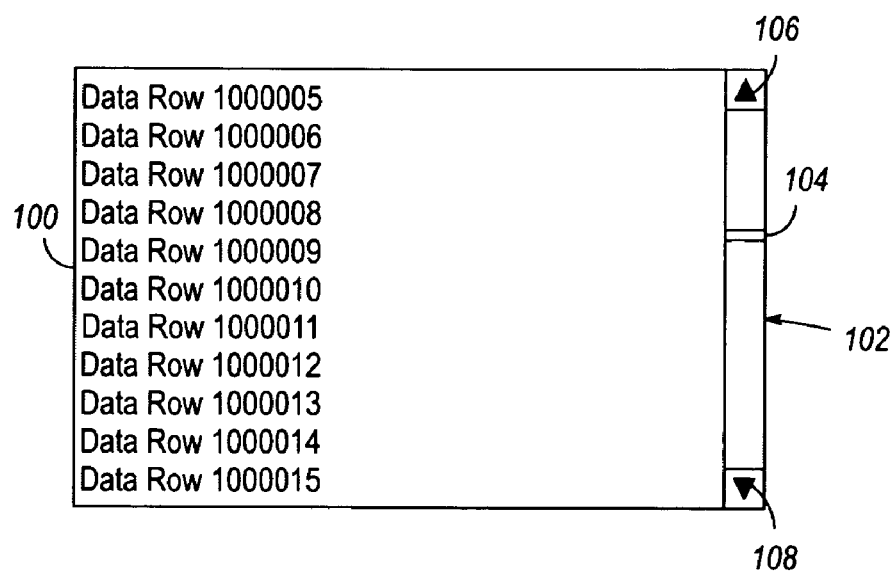
FIG. 1 illustrates an exemplary graphical display window associated with a graphical scrollbar.

FIG. 1 illustrates an exemplary graphical display window 100 associated with a graphical scrollbar 102. As is typical with graphical scrollbars 102, the scrollbar 102 comprises a grip 104. In use, a user may drag the grip 104 to move to a different location within a dataset, with the view of data displayed by the display window 100 updating accordingly. By way of example, the grip 104 is presumed to be capable of being moved to $2^{32}$ positions (although a user's coarse adjustment of the grip 104, combined with the resolution of a display, may mean that some of these positions are only logically obtainable and not physically obtainable).

Figure 2:
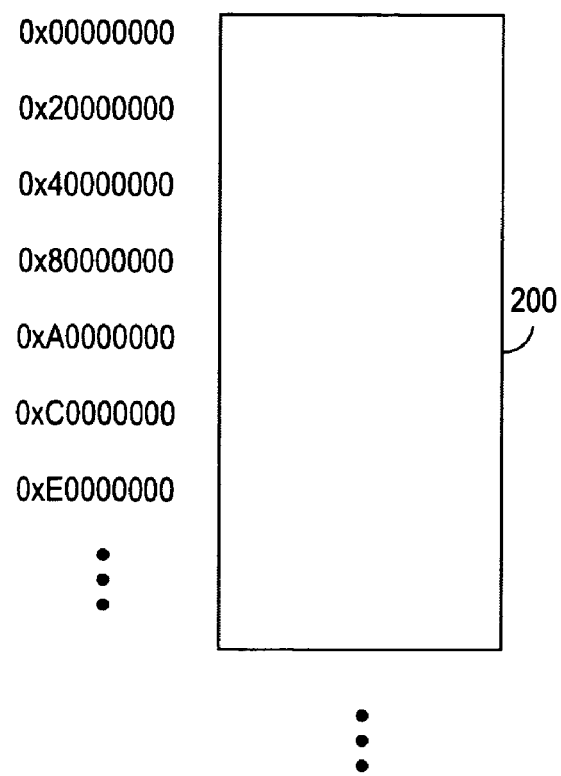
FIG. 2 illustrates an exemplary dataset having more addressable rows than the number of positions available to the scrollbar grip shown in FIG. 1.

FIG. 2 illustrates an exemplary dataset 200 that has more addressable rows than the grip 104 shown in FIG. 2 has positions. By way of example, the dataset 200 is presumed to have $2^{48}$ rows. For purposes of this description, "row" is used in a non-directional sense, and thus encompasses both horizontal rows of data and vertical columns of data.

Figure 3:
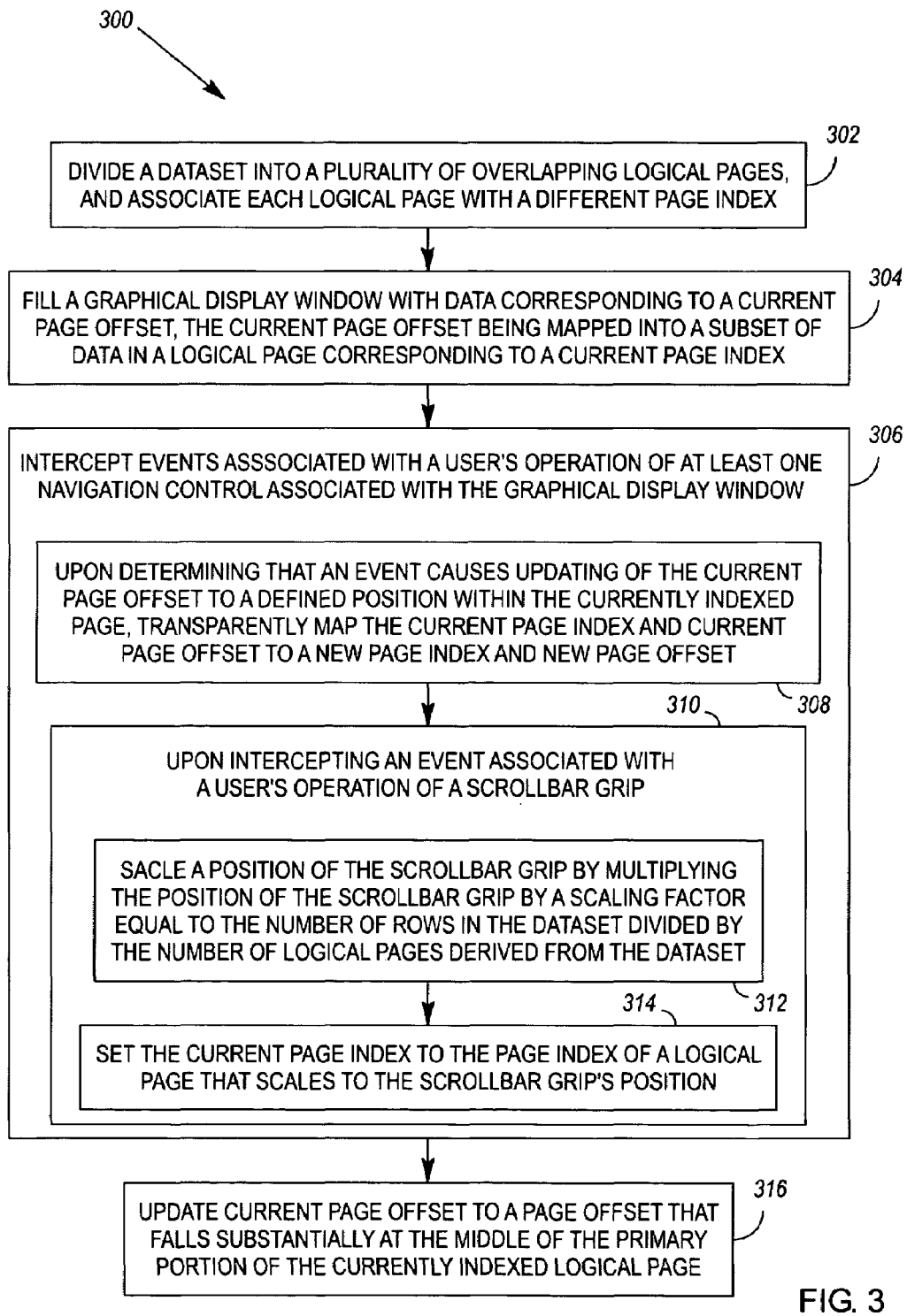
FIG. 3 illustrates an exemplary application of paging to the dataset shown in FIG. 2 and the graphical display window and scrollbar shown in FIG. 1.
Figure 4:
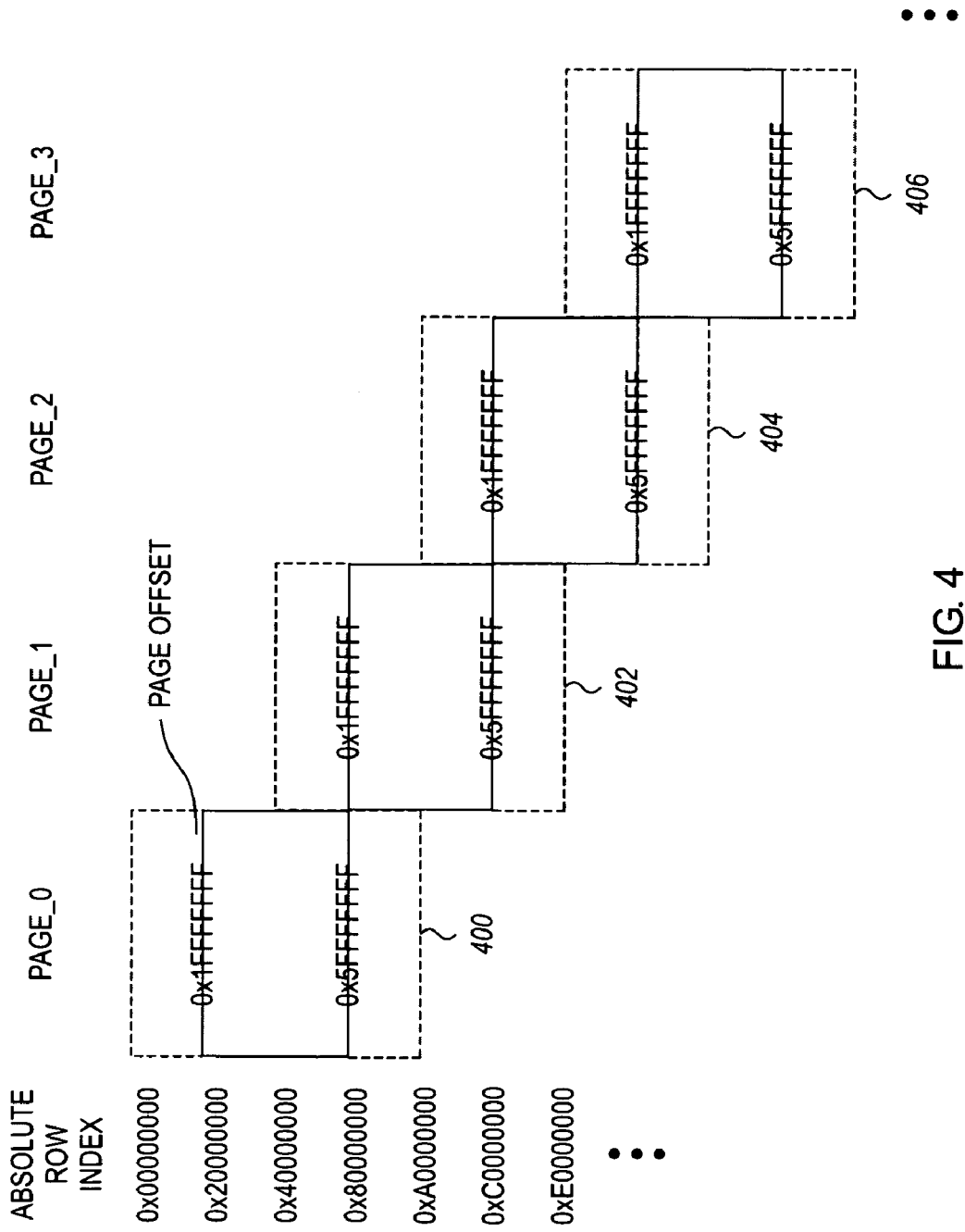
FIG. 4 illustrates the division of the FIG. 2 dataset into a plurality of overlapping logical pages.
Figure 5:
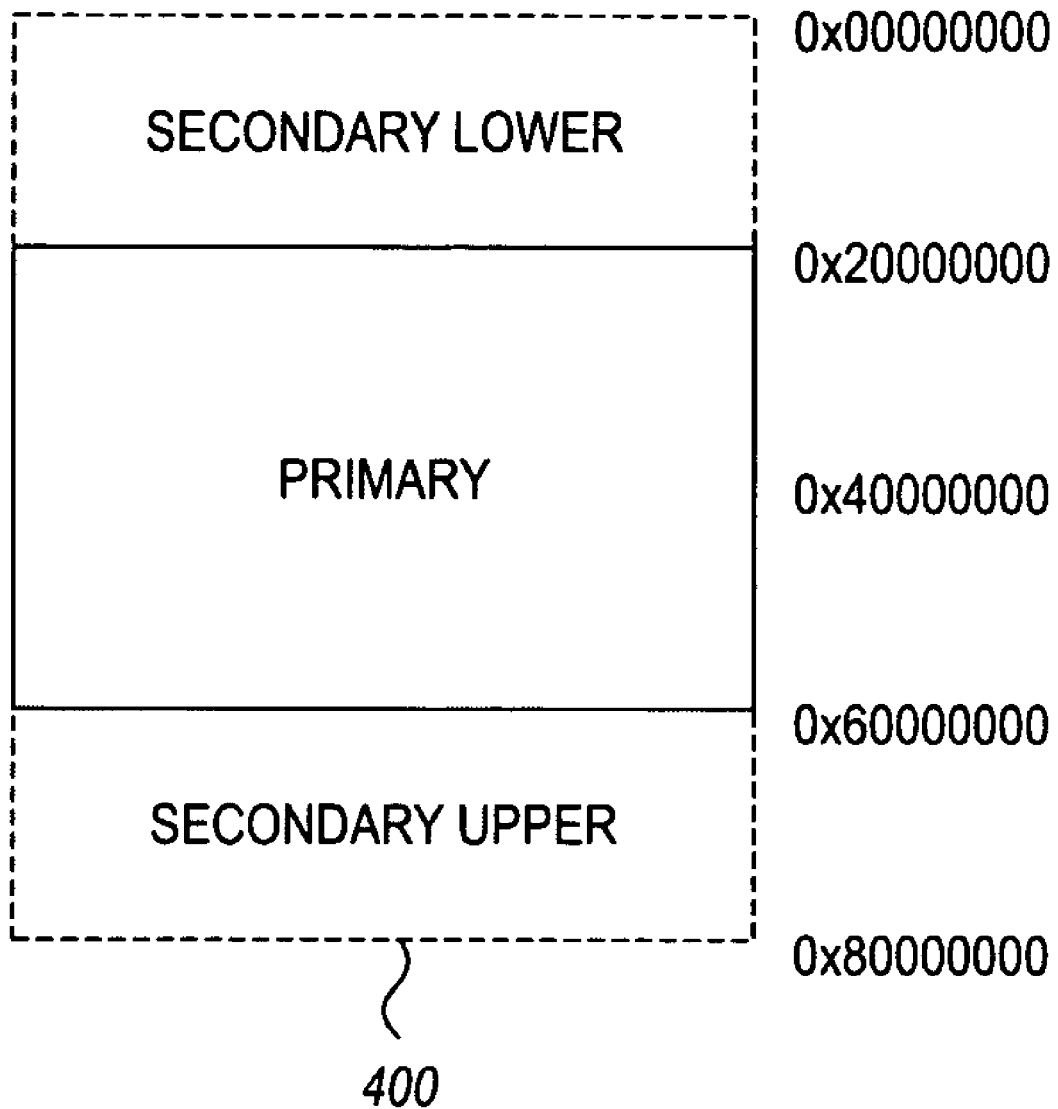
FIG. 5 illustrates an exemplary embodiment of one of the logical pages shown in FIG. 4.

FIG. 3 illustrates an exemplary application of paging to the dataset 200 shown in FIG. 2 and the graphical display window 100 and scrollbar 102 shown in FIG. 1. In accordance with the method 300, the dataset 200 is divided 302 into a plurality of overlapping logical pages 400, 402, 404, 406, each of which is associated with a different page index (e.g., PAGE_0, PAGE_1, PAGE_2, PAGE_3; see FIG. 4). In one embodiment, each of the logical pages 400-406 comprises a primary portion and at least one secondary portion. The secondary portion(s) bound one or both ends of the primary portion. See, for example, the logical page 400 shown in FIG. 5, wherein a primary portion of the logical page 400 is bounded by a secondary lower portion and a secondary upper portion.

With each logical page 400-406, the page's rows may be addressed via a page offset supplied by software controlling 1) the operation of the graphical display window 100, and 2) the outputs of any navigation controls 102, 106, 108 associated therewith. Exemplary navigation controls include a graphical scrollbar 102 (including an associated arrow pair 106, 108, if provided), as well as keyboard controls such as arrow keys, PAGE UP and PAGE DOWN keys, and HOME and END keys.

Each combination of page index and page offset are mapped to an absolute row index of the dataset 200 (i.e., a single row in the dataset 200). However, as a result of the overlap of the logical pages 400-406, each absolute row index may be mapped to a plurality of (and preferably two) page index and page offset combinations. For example, PAGE_0: 0x5FFFFFFF and PAGE_1: 0x1 FFFFFFF are both mapped to the absolute row index 0x80000000 (see FIG. 4).

In use, the graphical display window 100 is filled 304 with data corresponding to a current page offset of a currently indexed page. That is, the current page offset is mapped into a subset of data in a logical page corresponding to a current page index.

As a user operates the navigation controls associated with the graphical display window 100, events associated with the user's operation of these controls are intercepted 306. Typically, each time a user operates a navigation control, the current page offset will be updated, thereby causing a new subset of data to fill the graphical display window 100. Upon determining that the current page offset has been updated to a defined position within the currently indexed page, the method 300 transparently maps 308 the current page index and current page offset to a new page index and new page offset. In one embodiment, the position at which the mapping occurs is any position within a secondary portion of a logical page 400-406. By "transparent mapping", it is meant that the mapping event does not impact the range of data displayed within the graphical display window 100 (i.e., because the new page index and offset are mapped to the same absolute row index as the current page index and offset).

When a user operates a navigation control, the position of the graphical scrollbar 102's grip 104 may be updated. However, due to the disparity in resolution between 1) the number of positions of the scrollbar grip 104, and 2) the number of rows in the dataset 200, most local-type navigations (i.e., navigations within the data of a single logical page 400-406) will not lead to a change in the grip's position.

As will be described in more detail below, one useful result of the method 300 is that it enables the movement of a scrollbar grip 104 in proportion to the actual depth (i.e., number of rows) of a large dataset 200. Further, it can do so in a manner that minimizes page swapping. For example, the number of rows in a logical page's primary portion is preferably great enough to handle the majority of navigations that a user might undertake via scrollbar arrows 106, 108, arrow keys, and PAGE UP and PAGE DOWN keys. So long as the user navigates within a logical page's primary portion, no page swapping occurs. If, by chance, a user happens to navigate beyond the primary portion of a currently indexed page, the user's navigation may continue uninterrupted, and without incurring significant processing resources, as the user navigates through one of the logical page's secondary portions (which are also preferably large). However, if the user navigates into a logical page's secondary portion, a transparent mapping occurs such that, upon the user's next navigation, the user once again begins their navigation from within the large primary portion of the next sequential logical page.

Unlike arrow scrolling and page up/page down events, which a user typically uses to navigate within a somewhat small data range, some navigation events tend to lead to more significant jumps within a dataset 200. Two such navigation events are the dragging of a graphical scrollbar grip 104 and the use of a GOTO function.

Upon intercepting 310 an event corresponding to a user's dragging of a scrollbar grip 104, the method 300 may scale 312 the position of the scrollbar grip 104 by multiplying its position by a scaling factor. The scaling factor is equal to the number of rows in the dataset 200 divided by the number of logical pages derived from the dataset 200. The current page index may then be set 314 to the page index of a logical page that scales to the scrollbar grip 104's position. Upon updating the current page index, the method 300 may or may not update the current page offset. However, the method 300 preferably updates 316 the current page offset to a page offset that falls substantially at the middle of the primary portion of the currently indexed logical page. In this manner, when a user once again begins local-type navigations (e.g., scrolling, or paging up or down), they are unlikely, or at least less likely, to cause another page swap.

Another navigation event that tends to lead to more significant jumps within a dataset 200 is the GOTO function. Upon intercepting an event corresponding to a user's invocation of a GOTO function, the current page index and current page offset are preferably set to a page index and page offset that are both 1) mapped to an absolute row index corresponding to a location specified by the GOTO function, and 2) located within the primary portion of a logical page 400-406. Once again, by ensuring that the page index and page offset map to the primary portion of a logical page 400-406, the likelihood of another page swap is mitigated.

What is claimed is:

1. A method, comprising:

dividing a dataset into a plurality of overlapping logical pages and associating each of the logical pages with a different page index;

filling a graphical display window with data corresponding to a current page offset, the current page offset being mapped into a subset of data in a logical page corresponding to a current page index; and intercepting events associated with a user's operation of at least one navigation control associated with the graphical display window, and upon determining that an event causes updating of the current page offset to a defined position within the currently indexed page, transparently mapping the current page index and current page offset to a new page index and new page offset;

wherein a graphical scrollbar grip is associated with the graphical display window, and wherein the method further comprises, upon intercepting an event corresponding to the user's dragging of the scrollbar grip, scaling a position of the scrollbar grip by multiplying the position of the scrollbar grip by a scaling factor equal to the number of rows in the dataset divided by the number of logical pages derived from the dataset; and setting the current page index to the page index of a logical page that scales to the scrollbar grip's position.

2. The method of claim 1, further comprising:

providing each of the logical pages with a primary portion and a secondary portion; and upon setting the current page index to the page index of a logical page that scales to the scrollbar grip's position, setting the current page offset to a page offset falling substantially at the middle of the primary portion of the currently indexed logical page.

3. The method of claim 1, further comprising:

providing at least some of the logical pages with a primary portion, and secondary upper and lower portions on either end of the primary portion; and upon setting the current page index to the page index of a logical page that scales to the scrollbar grip's position, setting the current page offset to a page offset falling substantially at the middle of the primary portion of the currently indexed logical page.

4. A method, comprising:

dividing a dataset into a plurality of overlapping logical pages and associating each of the logical pages with a different page index:

filling a graphical display window with data corresponding to a current page offset, the current page offset being mapped into a subset of data in a logical page corresponding to a current page index: and intercepting events associated with a user's operation of at least one navigation control associated with the graphical display window, and upon determining that an event causes updating of the current page offset to a defined position within the currently indexed page, transparently mapping the current page index and current page offset to a new page index and new page offset:

wherein a GOTO function is associated with the graphical display window, and wherein the method further comprises:
  providing each of the logical pages with a primary portion and a secondary portion;
  mapping each combination of page index and page offset to an absolute row index of the dataset; and
  upon intercepting an event corresponding to the user's invocation of said GOTO function, setting the current page index and current page offset to a page index and page offset that are both i) mapped to an absolute row index corresponding to a location specified by the GOTO function, and ii) located within the primary portion of one of the logical pages.

5. A method, comprising:
dividing a dataset into a plurality of overlapping logical pages and associating each of the logical pages with a different page index:
filling a graphical display window with data corresponding to a current page offset, the current page offset being mapped into a subset of data in a logical page corresponding to a current page index: and
intercepting events associated with a user's operation of at least one navigation control associated with the graphical display window, and upon determining that an event causes updating of the current page offset to a defined position within the currently indexed page. transparently mapping the current page index and current page offset to a new page index and new page offset:
wherein a GOTO function is associated with the graphical display window, and wherein the method further comprises:
  providing at least some of the logical pages with a primary portion, and secondary upper and lower portions on either end of the primary portion;
  mapping each combination of page index and page offset to an absolute row index of the dataset; and
  upon intercepting an event corresponding to the user's invocation of said GOTO function, setting the current page index and current page offset to a page index and page offset that are both i) mapped to an absolute row index corresponding to a location specified by the GOTO function, and ii) located within the primary portion of one of the logical pages.

6. A method, comprising:
dividing a dataset into a plurality of overlapping logical pages and associating each of the logical pages with a different page index;
filling a graphical display window with data corresponding to a current page offset, the current page offset being mapped into a subset of data in a logical page corresponding to a current page index, and the graphical display window being associated with a graphical scrollbar grip; and
intercepting events associated with a user's operation of said scrollbar grip, and upon intercepting such an event, scaling a position of the scrollbar grip by multiplying the position of the scrollbar grip by a scaling factor equal to the number of rows in the dataset divided by the number of logical pages derived from the dataset; and
  setting the current page index to the page index of a logical page that scales to the scrollbar grip's position.

7. The method of claim 6, further comprising:
providing each of the logical pages with a primary portion and a secondary portion; and
upon setting the current page index to the page index of a logical page that scales to the scrollbar grip's position, setting the current page offset to a page offset falling substantially at the middle of the primary portion of the currently indexed logical page.

8. The method of claim 6, further comprising:
providing at least some of the logical pages with a primary portion, and secondary upper and lower portions on either end of the primary portion; and
upon setting the current page index to the page index of a logical page that scales to the scrollbar grip's position, setting the current page offset to a page offset falling substantially at the middle of the primary portion of the currently indexed logical page.

9. The method of claim 6, further comprising, intercepting events associated with a user's operation of at least navigation control associated with the graphical display window, other than the scrollbar grip, and upon intercepting such an event, updating the position of the scrollbar grip.

10. The method of claim 9, wherein said intercepted events comprise operation of at least one navigation control selected from the group consisting of: an arrow key, and a graphical scrollbar arrow.

11. The method of claim 9, wherein said intercepted events comprise operation of a PAGE UP or PAGE DOWN key.

12. The method of claim 6, wherein a GOTO function is associated with the graphical display window; the method further comprising:
  providing each of the logical pages with a primary portion and a secondary portion;
  mapping each combination of page index and page offset to an absolute row index of the dataset; and
  upon intercepting an event corresponding to a user's invocation of said GOTO function, setting the current page index and current page offset to a page index and page offset that are I) mapped to an absolute row index corresponding to a location specified by the GOTO function, and ii) located within the primary portion of one of the logical pages.

13. The method of claim 6, wherein a GOTO function is associated with the graphical display window; the method further comprising:
  providing at least some of the logical pages with a primary portion, and secondary upper and lower portions on either end of the primary portion;
  mapping each combination of page index and page offset to an absolute row index of the dataset; and
  upon intercepting an event corresponding to a user's invocation of said GOTO function, setting the current page index and current page offset to a page index and page offset that are i) mapped to an absolute row index corresponding to a location specified by the GOTO function, and ii) located within the primary portion of one of the logical pages.

* * * * *